(12) United States Patent
Botez et al.

(10) Patent No.: US 7,850,559 B2
(45) Date of Patent: Dec. 14, 2010

(54) HYDRAULIC TENSIONING SYSTEM

(75) Inventors: Lucian Botez, Novi, MI (US); Brandon Glass, Royal Oak, MI (US); Bolko Schuseil, Adelsdorf (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 611 days.

(21) Appl. No.: 11/911,768

(22) PCT Filed: Oct. 5, 2005

(86) PCT No.: PCT/EP2005/010711

§ 371 (c)(1),
(2), (4) Date: Oct. 17, 2007

(87) PCT Pub. No.: WO2006/045406

PCT Pub. Date: May 4, 2006

(65) Prior Publication Data

US 2008/0287232 A1    Nov. 20, 2008

Related U.S. Application Data

(60) Provisional application No. 60/622,125, filed on Oct. 26, 2004.

(51) Int. Cl.
*F16H 7/08* (2006.01)
*F16H 7/22* (2006.01)

(52) U.S. Cl. .................. 474/110; 474/111; 474/101; 474/103; 474/104

(58) Field of Classification Search .............. 474/110, 474/111, 109, 103, 101, 104, 135, 117, 119, 474/108, 115, 100, 188; 188/284, 316

See application file for complete search history.

(56) References Cited

U.S. PATENT DOCUMENTS

| | | | | |
|---|---|---|---|---|
| 2,703,019 A * | 3/1955 | Burawoy | ................... | 474/110 |
| 3,812,733 A * | 5/1974 | Yoshida | ................... | 474/111 |
| 3,964,331 A * | 6/1976 | Oldfield | ................... | 474/110 |
| 4,326,848 A * | 4/1982 | George et al. | ................ | 474/135 |
| 4,507,103 A * | 3/1985 | Mittermeier | ................ | 474/110 |
| 4,573,952 A * | 3/1986 | Schulze | ..................... | 474/110 |
| 4,657,524 A * | 4/1987 | Okabe | ....................... | 474/110 |

(Continued)

FOREIGN PATENT DOCUMENTS

DE    4443095    6/1996

(Continued)

*Primary Examiner*—Michael R Mansen
*Assistant Examiner*—Henry Liu
(74) *Attorney, Agent, or Firm*—Volpe and Koenig, P.C.

(57) ABSTRACT

A hydraulic tensioning system (10) for an endless drive (1) of an internal combustion engine (2). In an operating mode, the piston (9) of the tensioning system (10), which is supplied with a hydraulic fluid, is supported against a tensioning rail (6) with a non-positive fit, with the rail pre-tensioning the traction drive element (4). If the hydraulic fluid in the tensioning system (10) is not sufficient, the tensioning rail (6) is supported on an elastic end stop (13*a*) of the system (10).

3 Claims, 3 Drawing Sheets

U.S. PATENT DOCUMENTS

| | | | | |
|---|---|---|---|---|
| 4,722,720 | A * | 2/1988 | Ojima et al. | 474/101 |
| 4,743,224 | A * | 5/1988 | Yoshikawa et al. | 474/101 |
| 4,773,892 | A * | 9/1988 | Zarife et al. | 474/138 |
| 4,850,941 | A * | 7/1989 | Sosson | 474/110 |
| 4,863,417 | A * | 9/1989 | Kimata et al. | 474/101 |
| 4,881,927 | A * | 11/1989 | Suzuki | 474/110 |
| 4,902,266 | A * | 2/1990 | Ojima et al. | 474/111 |
| 4,952,198 | A * | 8/1990 | Cartaud et al. | 474/138 |
| 4,963,121 | A * | 10/1990 | Himura et al. | 474/110 |
| 4,976,661 | A * | 12/1990 | Ojima | 474/138 |
| 4,995,854 | A * | 2/1991 | Ojima | 474/111 |
| 5,090,946 | A * | 2/1992 | Futami et al. | 474/104 |
| 5,120,277 | A * | 6/1992 | Georget et al. | 474/117 |
| 5,248,282 | A * | 9/1993 | Suzuki | 474/110 |
| 5,370,584 | A * | 12/1994 | Todd | 474/110 |
| 5,391,118 | A * | 2/1995 | Tsai et al. | 474/138 |
| 5,458,542 | A * | 10/1995 | Sakai et al. | 474/135 |
| 5,577,970 | A * | 11/1996 | Smith et al. | 474/110 |
| 5,628,701 | A * | 5/1997 | Dembosky et al. | 474/103 |
| 5,632,698 | A * | 5/1997 | Suzuki | 474/110 |
| 5,653,653 | A * | 8/1997 | Ledvina | 474/110 |
| 5,676,614 | A * | 10/1997 | Inoue et al. | 474/110 |
| 5,700,213 | A * | 12/1997 | Simpson et al. | 474/110 |
| 5,700,214 | A * | 12/1997 | Kuznets et al. | 474/110 |
| 5,700,215 | A * | 12/1997 | Tada et al. | 474/110 |
| 5,700,216 | A * | 12/1997 | Simpson et al. | 474/110 |
| 5,718,650 | A * | 2/1998 | Smith et al. | 474/110 |
| 5,720,684 | A * | 2/1998 | Mott | 474/110 |
| 5,797,817 | A * | 8/1998 | Senftleben et al. | 474/110 |
| 5,833,220 | A * | 11/1998 | Nakakubo et al. | 267/226 |
| 5,833,563 | A * | 11/1998 | Takeda et al. | 474/138 |
| 5,842,943 | A * | 12/1998 | Tada | 474/109 |
| 5,860,881 | A * | 1/1999 | Tada | 474/110 |
| 5,868,638 | A * | 2/1999 | Inoue et al. | 474/110 |
| 5,879,255 | A * | 3/1999 | Yamamoto et al. | 474/110 |
| 5,879,256 | A * | 3/1999 | Tada | 474/110 |
| 5,885,179 | A * | 3/1999 | Lewis et al. | 474/110 |
| 5,935,031 | A * | 8/1999 | Tada | 474/110 |
| 5,951,423 | A * | 9/1999 | Simpson | 474/109 |
| 5,967,921 | A * | 10/1999 | Simpson et al. | 474/110 |
| 5,993,342 | A * | 11/1999 | Wigsten et al. | 474/110 |
| 6,045,471 | A * | 4/2000 | Suzuki | 474/109 |
| 6,053,831 | A * | 4/2000 | Boedo | 474/109 |
| 6,059,678 | A * | 5/2000 | Suzuki | 474/110 |
| 6,086,497 | A * | 7/2000 | Fukuda et al. | 474/110 |
| 6,093,123 | A * | 7/2000 | Baddaria et al. | 474/110 |
| 6,120,402 | A * | 9/2000 | Preston et al. | 474/109 |
| 6,126,563 | A * | 10/2000 | Simpson | 474/110 |
| 6,193,623 | B1 * | 2/2001 | Koch et al. | 474/110 |
| 6,196,939 | B1 * | 3/2001 | Simpson | 474/110 |
| 6,203,461 | B1 * | 3/2001 | Watanabe et al. | 474/110 |
| 6,244,982 | B1 * | 6/2001 | Merelli | 474/138 |
| 6,352,487 | B1 * | 3/2002 | Tada | 474/110 |
| 6,361,458 | B1 * | 3/2002 | Smith | 474/109 |
| 6,398,682 | B1 * | 6/2002 | Suzuki et al. | 474/110 |
| 6,435,992 | B2 * | 8/2002 | Wakabayashi et al. | 474/101 |
| 6,440,021 | B2 * | 8/2002 | Takamura et al. | 474/111 |
| 6,602,154 | B1 * | 8/2003 | Guichard et al. | 474/110 |
| 6,623,390 | B2 * | 9/2003 | Simpson et al. | 474/110 |
| 6,634,972 | B2 * | 10/2003 | Koch | 474/101 |
| 6,656,071 | B1 * | 12/2003 | Poiret | 474/109 |
| 6,666,784 | B1 * | 12/2003 | Iwamoto et al. | 474/109 |
| 6,689,001 | B2 * | 2/2004 | Oliver et al. | 474/134 |
| 6,695,730 | B2 * | 2/2004 | Amano et al. | 474/101 |
| 6,716,124 | B2 * | 4/2004 | Markley | 474/110 |
| 6,808,466 | B2 * | 10/2004 | Yoshida et al. | 474/110 |
| 6,849,012 | B2 * | 2/2005 | Poiret et al. | 474/110 |
| 6,966,858 | B2 * | 11/2005 | Yoshida et al. | 474/109 |
| 7,081,059 | B2 * | 7/2006 | Iwamoto et al. | 474/109 |
| 2002/0094894 | A1 * | 7/2002 | Poiret et al. | 474/101 |
| 2006/0094548 | A1 * | 5/2006 | Sato et al. | 474/109 |

FOREIGN PATENT DOCUMENTS

| | | |
|---|---|---|
| DE | 19631607 | 2/1998 |
| DE | 19909685 | 9/2000 |
| EP | 0812999 | 12/1997 |

\* cited by examiner though the start-up phase takes place with insufficient hydraulic fluid supply, and also the entire operating range of the internal combustion engine, in which the hydraulic damping system is no longer effective for high-frequency load alternations of the traction drive element due to its limited kinematic viscosity of the hydraulic fluid. Here, the damping effect results from the impact of the traction drive element on the elastic end stop.

HYDRAULIC TENSIONING SYSTEM

BACKGROUND

The present invention relates to a hydraulic tensioning system for an endless drive, especially a chain drive of an internal combustion engine. The tensioning system comprises a housing, in which a spring-mounted piston charged by a hydraulic fluid is guided so that it can move longitudinally. The piston together with the cylinder defines the boundaries of a pressure space filled with a hydraulic fluid. For damping adjustment movements of the piston, the hydraulic tensioning system includes a damping device, in which the hydraulic fluid can be discharged from the pressure space via at least one leakage gap.

Such a tensioning system is known, for example, from DE 196 31 607 A1. In this hydraulic tensioning system, a long standstill period of the internal combustion engine can have the result that the pressure drops in the pressure space of the tensioning system, because hydraulic fluid that charges the pressure space by the pressure circulating lubrication of the internal combustion engine escapes. When the internal combustion engine is started, in the time period up to reaching the pressure build-up in the pressure space, the hydraulic tensioning system is not in the position to realize a necessary biasing of the traction drive element. Consequently, an increased noise level is produced, caused by rattling or bumping of the traction drive element or a tensioning rail connected to the traction drive element on the tensioning system. Simultaneously, increased wear is produced in the start-up phase of the internal combustion engine until reaching the pressure build-up in the pressure space.

The noise generation in the start-up phase of the internal combustion engine for the known hydraulic tensioning systems does not satisfy the demands for comfort that are placed on today's vehicles. In the operating mode, these tensioning systems exert a predetermined tension on the traction drive element via a pressurized piston. The traction drive element, especially a chain, biased in normal operation reduces or eliminates wear due to elongation and damps vibrations as much as possible, wherein these vibrations are caused by rotational irregularity in the internal combustion engine and are introduced into the endless traction drive element. The known hydraulic tensioning systems, however, are not suitable for guaranteeing a low-noise guidance of the traction drive element for a reduced or insufficient pressure of the hydraulic fluid in the pressure space as well as for high-frequency loads on the traction drive element.

The problem of the invention is to further form a hydraulic tensioning system according to the class, such that this system guarantees an effective and low-noise guidance of the traction drive element in all of the operating modes of the internal combustion engine.

SUMMARY

This objective is met by tensioning systems according to the invention.

Through the structural setup of a tensioning system according to the invention, both for insufficient pressure build-up of the hydraulic fluid and also for high-frequency vibrations, the traction drive element of the traction drive is supported by an elastic end stop. This end stop forming a second damping device of the hydraulic tensioning system guarantees in the start-up phase of the internal combustion engine a low-noise guidance of the traction drive element. Here, the pressure space of the tensioning system, which is preferably connected to the pressurized oil circulating lubrication of the internal combustion engine, is not yet sufficiently filled with hydraulic fluid, whereby the piston of the tensioning system guarantees no or not sufficient biasing of the traction drive element.

Through the measure according to the invention, in the start-up phase of the internal combustion engine, a large disadvantageous distance between the hydraulic tensioning system and traction drive element is prevented, wherein vibrations of the traction drive element are damped effectively on the tensioning system according to the invention due to the elastic end stop. In this way, disadvantageous vibrations of the traction drive are stopped, as well as disadvantageous rattling or knocking of the chain, which increases the noise generation, due to the guiding property of the elastic end stop.

In addition to an advantageous low-noise function in the start-up phase, the tensioning system according to the invention also offers a noise-optimized and secure guidance of the traction drive element for high-frequency vibrations of the endless drive in the normal operating mode. The rotational irregularity of the internal combustion engine can lead to high-frequency vibrations of the endless drive, which also trigger knocking or rattling of the traction drive element. Here, the piston of the hydraulic tensioning system is exposed to impact loading, which triggers a transient adjustment movement of the piston directed against the force application as a function of the kinematic viscosity of the hydraulic fluid. When forced back, the piston causes the traction drive element, which contacts the elastic end stop, to become slack.

The invention relates to a tensioning system for a belt or chain drive, in which the tensioning elements are biased by means of a spring-mounted belt or chain drive that can be displaced linearly or that can be pivoted. By means of a first damping device, which includes, for example, a pressurized friction disk, the adjustment movement is damped. As a second damping device, the invention also includes an elastic end stop, on which the belt or chain drive that can be displaced or pivoted is supported in an end position or impacts for high-frequency vibrations of the traction drive element.

For previous tensioning systems, the transient slackening leads to knocking or rattling of the traction drive element or to impacts of the chain, for example, on the housing of the tensioning system. According to the invention, advantageously the impact loading for high-frequency vibrations of the tension-means drive, especially the chain, is effectively absorbed or stopped by the second damping system according to the invention in the tensioning system. In this way, an improved mechanical efficiency and an increased fatigue strength of the traction drive element and thus the entire traction drive are provided.

Advantageously, the elastic end stop according to the invention eliminates disadvantageous deflections of the traction drive element or limits their amplitudes in all of the operating modes of the internal combustion engine, which has an advantageous effect on the function and the service life of the entire endless drive. Here, the elastic end stop according to the invention represents a structurally simple component, which can be produced and mounted economically. This produces a cost-optimized effective solution, which reduces the noise level of the traction drive element and thus satisfies today's demands for comfort.

The additional damping system according to the invention, which includes an elastic end stop for a hydraulic tensioning system, works parallel to the hydraulic unit, but is activated only in boundary regions when the hydraulic tensioning system is deactivated. Counted here are especially the start-up phase of the internal combustion engine, in which insufficient pressure of the hydraulic fluid has still not been established, or high high-frequency vibrations of the traction drive element, in which the piston moves transiently in the cylinder.

When needed, the elastic end stop according to the invention can be retrofitted. For example, this component can be integrated into already delivered vehicles within the scope of a vehicle inspection. In addition to an economical production and mounting, the elastic end stop according to the invention needs no additional installation space, so that no adapter construction is necessary.

Additional advantageous constructions of the invention are the subject matter of the invention.

According to an advantageous construction of the invention, an elastic peg, which is allocated to the housing of the hydraulic tensioning system, is provided as the end stop. Here, as the peg a component is provided, whose length extends part an outer region of the piston from the housing in a retracted end position. Thus it is guaranteed that, for example, in a start-up phase of the internal combustion engine, in which there is still insufficient pressure of the hydraulic fluid in the pressure space of the hydraulic tensioning system and consequently the piston is not pressurized, the traction drive element is guided directly or indirectly on the end stop or impacts against this end stop.

As one advantageous construction, the invention includes a hollow cylindrical peg as the elastic end stop. This peg, which is fixed, in particular, to the housing, surrounds the piston in the mounted state while maintaining an annular gap, whereby the function of the piston in the operating modes is not prevented. The hydraulic tensioning system has an active connection, which is allocated directly to the traction drive element, preferably with a tensioning or guide rail. In the operating mode of the internal combustion engine and successful pressure build-up in the pressure space of the hydraulic tensioning system, the piston is supported against the tensioning rail.

The invention includes different structurally shaped elastic end stops positioned on the hydraulic tensioning system. Preferably, the end stop formed as a hollow cylindrical peg is fixed on the housing. The attachment can be realized, for example, by adhesion. For this purpose, each end surface of the housing and the peg forms a sufficient contact surface, with which an effective adhesion and permanent attachment of the end stop can be achieved.

Alternatively or additionally, it is possible to center the end stop formed as a hollow cylindrical peg, which is also designated as a muffle (or sleeve), on a section of the cylinder projecting from the housing of the tensioning system. This arrangement advantageously increases the contact surface between the peg, on one hand, and the connected components of the tensioning system, on the other hand, for achieving a permanent attachment.

Another construction of the invention proposes a multiple-part construction of the elastic end stop. For achieving a wear-optimized end stop, this is preferably provided with end reinforcement, for example, a plate, which is preferably connected to the elastic material of the end stop. The reinforcement or the disk is preferably made from a high-strength, wear-resistant plastic, whereby continuous guidance of the traction drive element is guaranteed in the start-up phase of the internal combustion engine.

As an alternative or addition to an end plate, it is further possible to provide the end stop with a length-limited bushing. The bushing here extends over a length that corresponds to the dimension of the section of the cylinder projecting from the housing. Thus, the bushing can be pressed onto the projecting section of the cylinder, for example, by means of a press fit. The metallic bushing and also the end plate are connected with a positive fit preferably by means of vulcanization or ultrasonic welding to the elastic material of the end stop.

As a material for the elastic end stop, preferably an elastomer is provided or some other suitable material, which is both resistant to the lubricant and which can also be used permanently in high ambient temperatures of >150° C.

For the hydraulic tensioning system, the invention further includes a sealed annular gap between the end stop and the piston. Here, preferably a seal is suitable, which is allocated to the end stop in the region of the central borehole and whose sealing lip is guided on the casing surface of the piston with low radial biasing. This measure also effectively prevents the entry of very small rubbed-off parts into the leakage gap, which is set between the piston and the cylinder wall. On the other hand, the sealing lip does not influence the damping device, when hydraulic fluid is discharged via the leakage gap.

DETAILED DESCRIPTION OF THE PREFERRED EMBODIMENTS

Figure 1:
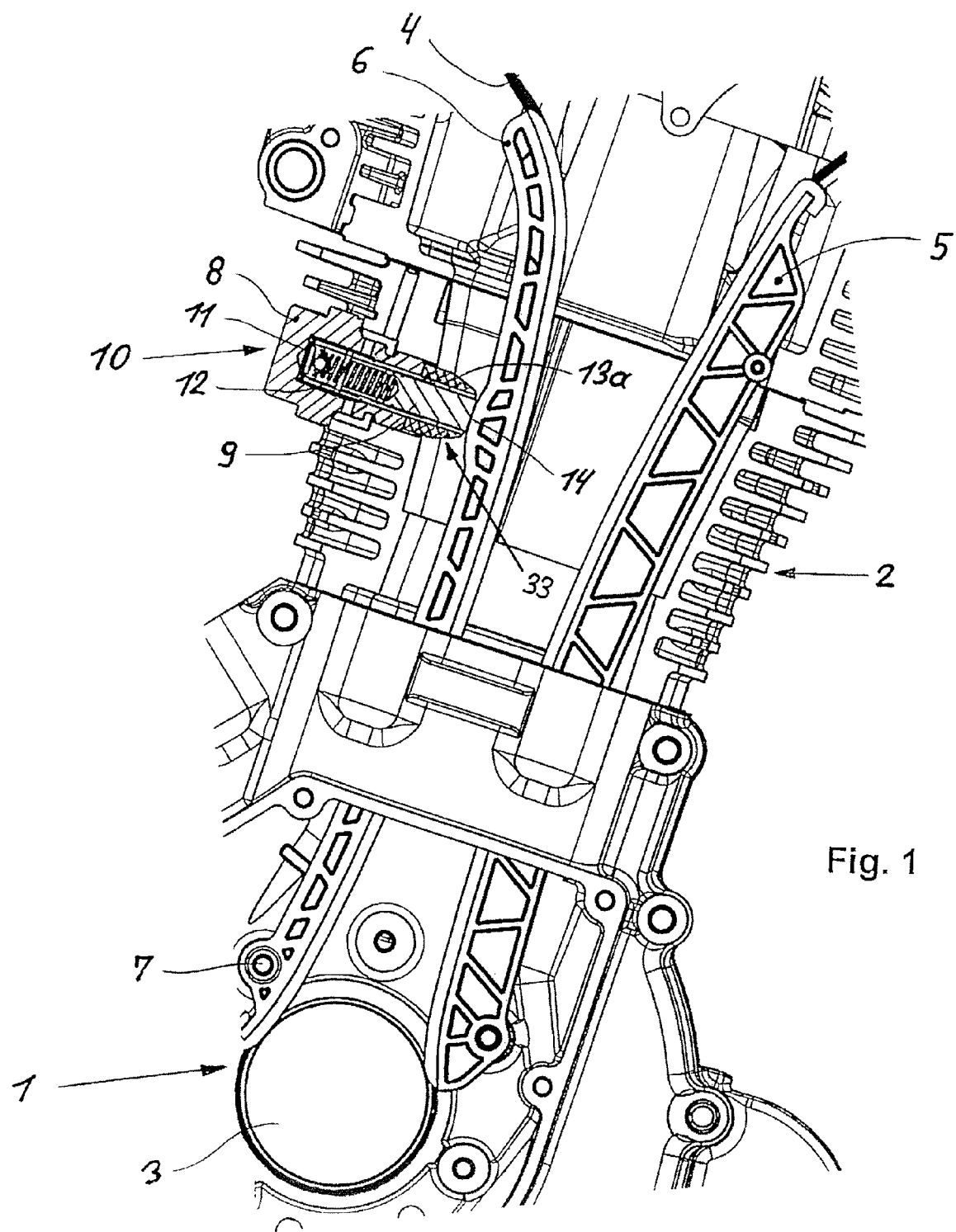
FIG. 1: a view of an endless drive in the mounted state, in connection with the hydraulic tensioning system according to the invention.

FIG. 1 shows, in section, an endless drive 1, which is formed as a chain drive of an internal combustion engine 2. The endless drive 1 designed as a control drive is used for driving camshafts of the internal combustion engine 2, which are not shown in FIG. 1. The drive is formed here by the drive wheel 3 rotating in the clockwise direction and connected to the crankshaft of the internal combustion engine 2 by a traction drive element 4, a chain on the additional chain drives not shown in FIG. 1 and connected to camshafts of the internal combustion engine 2. In the tensioned section of the endless drive 1, the traction drive element 4 is guided on a guide rail 5. A tensioning rail 6, which can pivot about a rotational axis 7, is allocated to the slack section of the traction drive element 4. At a distance to the rotational axis 7, a hydraulic tensioning system 10, which applies a force to pivot the tensioning rail 6 in the clockwise direction and in this way biases the traction drive element 4, is allocated to the tensioning rail 6. The hydraulic tensioning system 10 is fixed in position with a housing 8 on the internal combustion engine 2. For applying force on a piston 9 integrated into the housing 8, a pressure space 11 of the tensioning system 10 is connected to a pressure circulating lubrication of the internal combustion engine 2. In addition, the piston 9 is spring mounted via a compression spring 12, which is inserted in the pressure space 11 and which constantly presses the piston 9 with a relatively low initial load against the tensioning rail 6.

Stopping of the internal combustion engine 2 leads to a drop in the oil pressure of the pressure circulating lubrication, associated with a loss of hydraulic fluid of the hydraulic tensioning system 10, whereby the piston 9 contacts the tensioning rail 6 only with the force of the compression spring 12. When the internal combustion engine 2 is restarted, and until pressure is built up in the pressure space 11, the traction drive element 4 is not sufficiently biased, which leads to large deflections of the traction drive element 4 in connection with adjustment movements of the tensioning rail 6. Here, the spring-mounted piston 9 is forced back, whereby the tensioning rail 6 impacts against or is supported on an elastic end stop 13a. This measure reduces the generation of noise in the endless drive 1 in the start-up phase, which simultaneously reduces the wear of the piston 9 and the tensioning rail 6 in the region of a contact surface 14 of these components.

Figure 2:
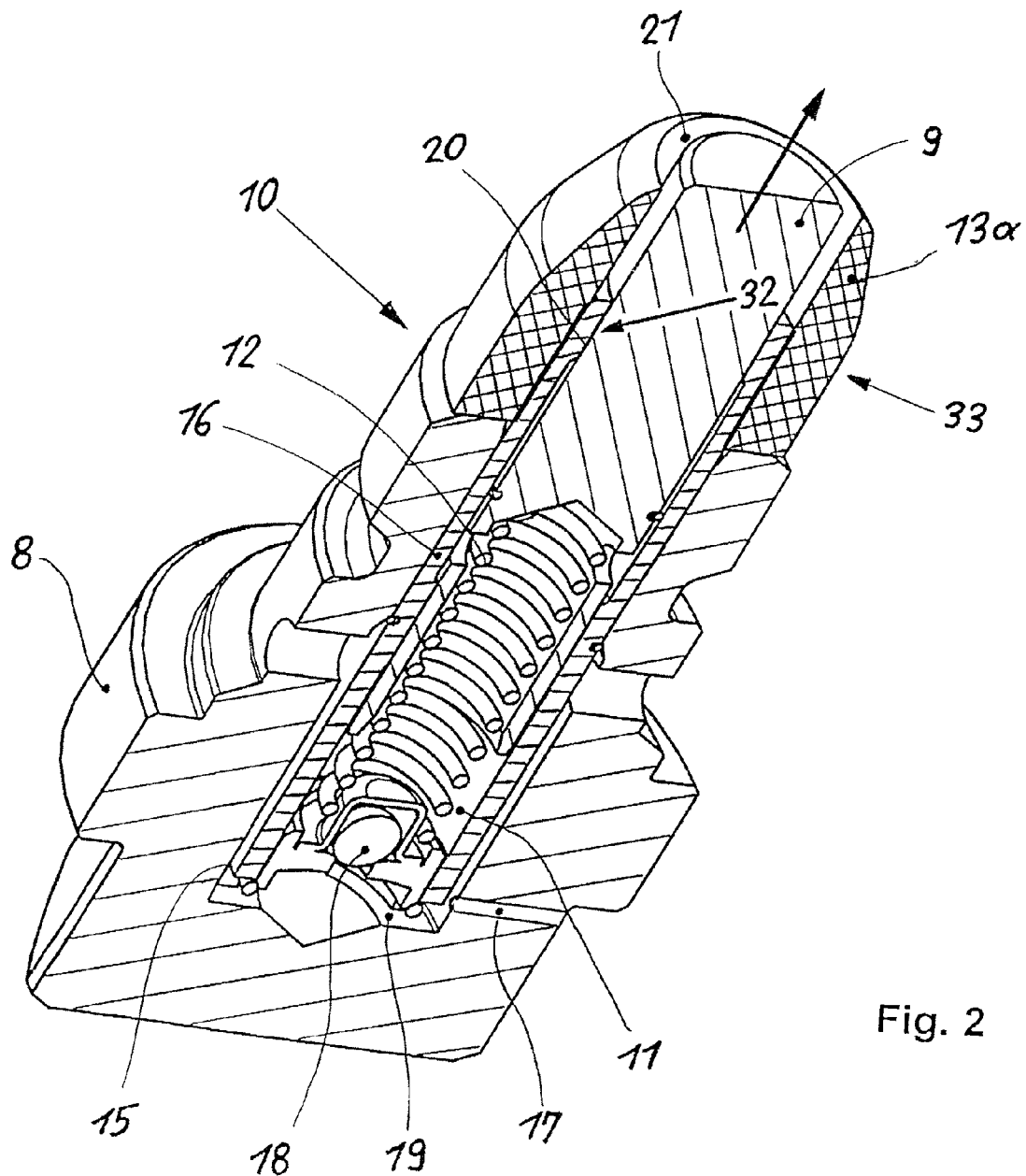
FIG. 2: a perspective, cross-sectional view of the tensioning system according to the invention.

FIG. 2 illustrates additional details of the hydraulic tensioning system 10. The housing 8, which is shaped, for example, rotationally symmetric, is provided with a central blind borehole 15, which is designed for holding a cylinder 16. The cylinder 16, shaped as a sleeve, is used for holding the piston 9, wherein the components including the cylinder 16 and the piston 9 limit the pressure space 11. For this purpose, the cylinder 16 has on the end a spring-loaded one-way valve 18, which separates the pressure space 11 from a storage space 19 locally surrounding the cylinder 16 and integrated into the housing 8 for the hydraulic fluid. For pressurizing the storage space 19 through a feed borehole 17 formed in the housing 8, the hydraulic fluid is led via the one-way valve 18 into the pressure space 11 and shifts the piston 9 until it contacts the tensioning rail 6.

When peak forces appear, which are transferred to the tensioning rail 6, for example, through impact loading of the traction drive element 4, the piston 9 is also loaded opposite the direction of the arrow. Therefore, some amount of the hydraulic fluid is discharged through the damping device 32 formed as a leakage gap 20 between the casing surface of the piston 9 and an inner wall of the cylinder 16. The discharged hydraulic fluid can flow back into the oil sump without pressure, for example, within the internal combustion engine 2. After just a small movement opposite the direction of the arrow, the tensioning rail 6 shown in FIG. 1 is supported on the end surface 21 of the elastic end stop 13a, the second damping device 33, through which the disadvantageous generation of noise is stopped.

Figure 3:
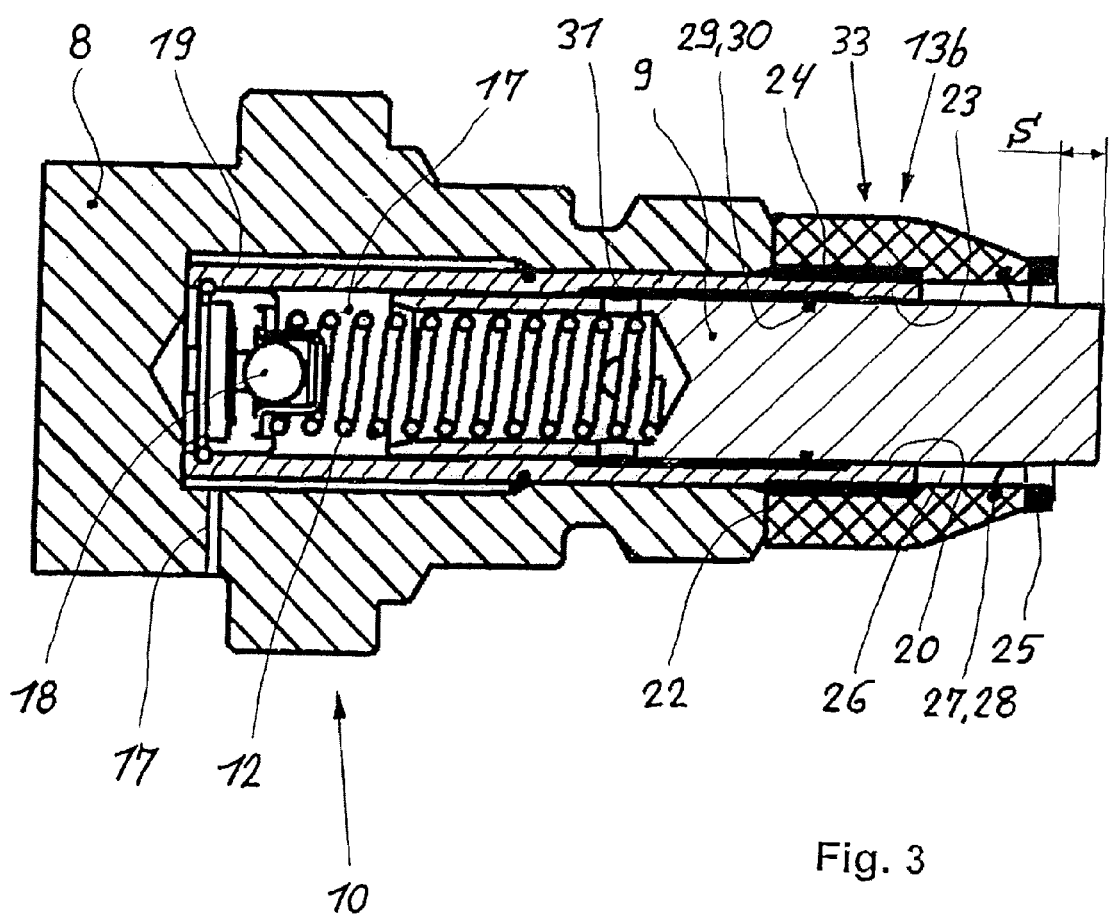
FIG. 3: a tensioning system according to the invention in longitudinal section.

FIG. 3 shows special variants according to the invention for the end stop 13b. To fix the position of the end stop 13b on the housing 8, an adhesion between the end sides of the housing 8 and the end stop 13b is possible, which together form a contact surface 22. Furthermore, the end stop 13b is centered on a section 23 of the cylinder 16, which projects from the housing 8 and simultaneously guides the piston 9. For improved attachment, a reinforced end stop 13b is possible, which includes a bushing 24 preferably made from steel and pressed onto the section 23 of the cylinder 16.

Furthermore, the end stop 13b includes a wear-optimized plate 25 on the end, on which the tensioning rail 6 is supported in the start-up phase of the internal combustion engine 2. The plate 25 is preferably made from a wear-resistant, for example, glass fiber-reinforced plastic. Correspondingly, the bushing 24 and also the plate 25 are connected with a positive fit to the other elastic body of the end stop 13b. For this purpose, vulcanization or ultrasonic welding is suitable. The end stop 13b also comprises a seal 27, having a sealing lip 28 that contacts the casing surface of the piston 9 with a small support force, for achieving a sealed annular gap 26, which is set between the piston 9 and the end stop 13b. The sealing lip 28 prevents, on one hand, a disadvantageous entry, for example, of oil foam into the annular gap 26 and allows, on the other hand, unimpaired function of the damping device 32, i.e., discharge of the hydraulic fluid via the leakage gap 20 for a piston travel in the direction of the one-way valve 18.

FIG. 3 shows the piston 3 of the hydraulic tensioning system in the operating position, in which the piston 9 pressurized by the pressure of the hydraulic fluid is supported with a force fit on the tensioning rail 6 shown in FIG. 1. This produces a travel "s" between the end sides of the piston 9 and the end stop 13b. The maximum adjustment path of the piston 9 relative to the cylinder 16 is limited by a retaining ring 29, which is inserted with a partial cross-sectional surface in an annular groove 30 of the piston 9 and whose outer contours are guided in a length-limited recess 31 of the cylinder 16.

LIST OF REFERENCE SYMBOLS

1 Endless drive
2 Internal combustion engine
3 Drive wheel
4 Traction drive element
5 Guide rail
6 Tensioning rail
7 Rotational axis
8 Housing
9 Piston
10 Tensioning system
11 Pressure space
12 Compression spring
13a End stop
13b End stop
14 Contact surface
15 Borehole
16 Cylinder
17 Feed borehole
18 One-way valve
19 Storage space
20 Leakage gap
21 End face
22 Contact surface
23 Section
24 Bushing
25 Plate
26 Annular gap
27 Seal
28 Sealing lip
29 Retaining ring
30 Annular groove
31 Recess
32 Damping device
33 Damping device

The invention claimed is:

1. Hydraulic tensioning system for an endless drive of an internal combustion engine, comprising a housing for holding a cylinder, in which a spring-mounted piston pressurized by a hydraulic fluid and interacting with a traction drive element is guided so that the traction drive element can move longitudinally; the piston together with the cylinder define boundaries of a pressure space filled with hydraulic fluid, for damping adjustment movements of the piston; a damping device is provided, in which some amount of the hydraulic fluid can be discharged from the pressure space via at least one leakage gap, and a drop in pressure and/or high-frequency vibrations of the endless drive, the traction drive element is supported on an elastic end stop placed on said cylinder housing and surrounds the cylindrical surface of the piston and forms a second damping device in the hydraulic tensioning system, the end stop is constructed in several parts; is produced from an elastomer or other elastic material and the elastic end stop includes on one end, a plate, produced from a wear-resistant plastic and which interacts with a tensioning rail in a start-up phase of the internal combustion engine.

2. Hydraulic tensioning system for an endless drive of an internal combustion engine, comprising a housing for holding a cylinder, in which a spring-mounted piston pressurized by a hydraulic fluid and interacting with a traction drive element is guided so that the traction drive element can move longitudinally; the piston together with the cylinder define boundaries of a pressure space filled with hydraulic fluid, for damping adjustment movements of the piston; a damping device is provided, in which some amount of the hydraulic fluid can be discharged from the pressure space via at least one leakage gap, and a drop in pressure and/or high-frequency vibrations of the endless drive, the traction drive element is supported on an elastic end stop placed on said cylinder housing and surrounds the cylindrical surface of the piston and forms a second damping device in the hydraulic tensioning system, the end stop is constructed in several parts; is produced from an elastomer or other elastic material; the end stop includes a limited-length bushing, produced from a metallic material, which is fixed on the housing and/or the cylinder, and which is connected with a positive fit to an elastic body of the end stop.

3. Hydraulic tensioning system for an endless drive of an internal combustion engine, comprising a housing for holding a cylinder, in which a spring-mounted piston pressurized by a hydraulic fluid and interacting with a traction drive element is guided so that the traction drive element can move longitudinally; the piston together with the cylinder define boundaries of a pressure space filled with hydraulic fluid, for damping adjustment movements of the piston; a damping device is provided, in which some amount of the hydraulic fluid can be discharged from the pressure space via at least one leakage gap, and a drop in pressure and/or high-frequency vibrations of the endless drive, the traction drive element is supported on an elastic end stop placed on said cylinder housing and surrounds the cylindrical surface of the piston and forms a second damping device in the hydraulic tensioning system, and the end stop is produced from an elastomer or other elastic material and comprises a seal with a sealing lip, inserted into an annular gap bounded radially by the piston and the end stop, and the sealing lip is supported on a casing surface of the piston in a sealed manner.

* * * * *